(12) United States Patent
Kim et al.

(10) Patent No.: US 10,873,970 B2
(45) Date of Patent: Dec. 22, 2020

(54) DOWNLINK SIGNAL RECEIVING METHOD AND USER EQUIPMENT, AND DOWNLINK SIGNAL TRANSMITTING METHOD AND BASE STATION

(71) Applicant: LG ELECTRONICS INC., Seoul (KR)

(72) Inventors: Eunsun Kim, Seoul (KR); Suckchel Yang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 16/097,212

(22) PCT Filed: Apr. 26, 2017

(86) PCT No.: PCT/KR2017/004448
§ 371 (c)(1),
(2) Date: Oct. 26, 2018

(87) PCT Pub. No.: WO2017/188729
PCT Pub. Date: Nov. 2, 2017

(65) Prior Publication Data
US 2019/0141737 A1    May 9, 2019

Related U.S. Application Data

(60) Provisional application No. 62/327,996, filed on Apr. 26, 2016.

(51) Int. Cl.
*H04W 72/14* (2009.01)
*H04W 72/04* (2009.01)

(52) U.S. Cl.
CPC ......... *H04W 72/14* (2013.01); *H04W 72/042* (2013.01); *H04W 72/0446* (2013.01)

(58) Field of Classification Search
None
See application file for complete search history.

(56) References Cited

U.S. PATENT DOCUMENTS

2011/0038271 A1\* 2/2011 Shin ................ H04W 52/08
                                                         370/252
2011/0122825 A1\* 5/2011 Lee ................. H04W 28/06
                                                         370/328

(Continued)

FOREIGN PATENT DOCUMENTS

WO    2015061987    5/2015

OTHER PUBLICATIONS

PCT International Application No. PCT/KR2017/004448, Written Opinion of the International Searching Authority dated Jul. 24, 2017, 16 pages.

(Continued)

*Primary Examiner* — Andre Tacdiran
(74) *Attorney, Agent, or Firm* — Lee Hong Degerman Kang Waimey

(57) ABSTRACT

In a control region of a first subframe, first downlink control information (DCI) for a second subframe may be transmitted to a user equipment. The user equipment monitors DCI in a control region of the second subframe. The user equipment operates on the basis of the second DCI if the second DCI for the second subframe is detected in the control region of the second subframe, and can receive downlink data or transmit uplink data in a data area of the second subframe on the basis of the first DCI if the second DCI is not detected.

12 Claims, 10 Drawing Sheets

(56) References Cited

U.S. PATENT DOCUMENTS

| | | | | |
|---|---|---|---|---|
| 2011/0124360 | A1* | 5/2011 | Sagfors | H04W 28/18 |
| | | | | 455/509 |
| 2014/0307622 | A1* | 10/2014 | Horn | H04W 28/10 |
| | | | | 370/328 |
| 2015/0071207 | A1* | 3/2015 | Seo | H04W 76/14 |
| | | | | 370/329 |
| 2016/0095093 | A1* | 3/2016 | Yi | H04L 5/001 |
| | | | | 370/280 |
| 2016/0105882 | A1* | 4/2016 | Park | H04B 7/024 |
| | | | | 370/329 |
| 2016/0128095 | A1* | 5/2016 | Damnjanovic | H04L 5/0092 |
| | | | | 370/336 |
| 2016/0323906 | A1* | 11/2016 | Wang | H04W 72/1236 |
| 2017/0222749 | A1* | 8/2017 | Dinan | H04L 1/0023 |
| 2017/0223675 | A1* | 8/2017 | Dinan | H04L 5/0092 |
| 2017/0272199 | A1* | 9/2017 | Dinan | H04L 27/0006 |
| 2018/0123769 | A1* | 5/2018 | Pelletier | H04L 5/001 |
| 2018/0255568 | A1* | 9/2018 | Takeda | H04W 24/10 |
| 2018/0279269 | A1* | 9/2018 | Froberg Olsson | H04W 72/042 |
| 2019/0052329 | A1* | 2/2019 | Aiba | H04L 5/0044 |
| 2019/0230701 | A1* | 7/2019 | Golitschek Edler Von Elbwart | H04W 72/14 |
| 2019/0373629 | A1* | 12/2019 | Mukkavilli | H04W 72/1289 |
| 2020/0059345 | A1* | 2/2020 | Pelletier | H04W 74/006 |

OTHER PUBLICATIONS

LG Electronics, "Multi-subframe scheduling in LAA", 3GPP TSG RAN WG1 Meeting #84bis, R1-162466, Apr. 2016, 5 pages.

ZTE, et al., "Discussion on UL Scheduling for LAA", 3GPP TSG RAN WG1 Meeting #84bis, R1-162322, Apr. 2016, 6 pages.

Intel, "On the Support of Cross-burst Scheduling", 3GPP TSG RAN WG1 Meeting #84bis, R1-162353, Apr. 2016, 4 pages.

CMCC, "Further discussion on issues related to PUSCH transmission for LAA", 3GPP TSG RAN WG1 Meeting #84bis, R1-162858, R1-162858, Apr. 2016, 6 pages.

* cited by examiner

DOWNLINK SIGNAL RECEIVING METHOD AND USER EQUIPMENT, AND DOWNLINK SIGNAL TRANSMITTING METHOD AND BASE STATION

CROSS-REFERENCE TO RELATED APPLICATIONS

This application is the National Stage filing under 35 U.S.C. 371 of International Application No. PCT/KR2017/004448, filed on Apr. 26, 2017, which claims the benefit of U.S. Provisional Application No. 62/327,996, filed on Apr. 26, 2016, the contents of which are all hereby incorporated by reference herein in their entirety.

TECHNICAL FIELD

The present invention relates to a wireless communication system, and more particularly, to methods and devices for transmitting/receiving downlink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of a downlink (DL) signal by a user equipment (UE). The method comprises: receiving first DL control information (DCI) for a second subframe in a control region of a first subframe; monitoring DCI in a control region of the second subframe; and performing an operation based on second DCI for the second subframe when the second DCI is detected in the control region of the second subframe, and receiving DL data or transmitting uplink (UL) data in a data region of the second subframe based on the first DCI when the second DCI is not detected.

In another aspect of the present invention, provided herein is a method of transmitting a downlink (DL) signal by a base station (BS). The method may comprise: transmitting first DL control information (DCI) for a second subframe to a user equipment (UE) in a control region of a first subframe; and performing an operation based on second DCI for the second subframe when transmitting second DCI for the second subframe to the UE in a control region of the second subframe, and transmitting DL data or receiving uplink (UL) data in a data region of the second subframe based on the first DCI when not transmitting the second DCI.

In a further aspect of the present invention, provided herein is a user equipment (UE) for receiving a downlink (DL) signal. The UE includes a radio frequency (RF) unit, and a processor configured to control the RF unit. The processor may: control the RF unit to receive first DL control information (DCI) for a second subframe in a control region of a first subframe; monitor DCI in a control region of the second subframe; and control the RF unit based on second DCI for the second subframe when the second DCI is detected in the control region of the second subframe and controls the RF unit to receive DL data or transmit uplink (UL) data in a data region of the second subframe based on the first DCI when the second DCI is not detected.

In a still further aspect of the present invention, provided herein is a base station (BS) for transmitting a downlink (DL) signal. The BS includes a radio frequency (RF) unit, and a processor configured to control the RF unit. The processor may: control the RF unit to transmit first DL control information (DCI) for a second subframe to a user equipment (UE) in a control region of a first subframe; and control the RF unit based on second DCI for the second subframe when the second DCI is transmitted to the UE in a control region of the second subframe and controls the RF unit to transmit DL data or receive uplink (UL) data in a data region of the second subframe based on the first DCI when the second DCI is not transmitted.

In each aspect of the present invention, the second DCI may include different resource allocation information from the first DCI. When the second DCI is detected in the control region of the second subframe, the DL data may be received or the UL data may be transmitted in the data region of the second subframe according to the different resource allocation information.

In each aspect of the present invention, the second DCI may include information indicating that the first DCI is not valid in the second subframe.

In each aspect of the present invention, the second DCI may indicate in which subframe after the second subframe the first DCI is valid.

In each aspect of the present invention, when the first DCI is a DL grant, a DL reference signal configured in the second subframe is present, the second DCI is detected in the control region of the second subframe, and the second DCI is a UL grant, the UL data may be transmitted on time symbols on which the DL reference signal is not present within the second subframe.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR INVENTION

Figure 1:
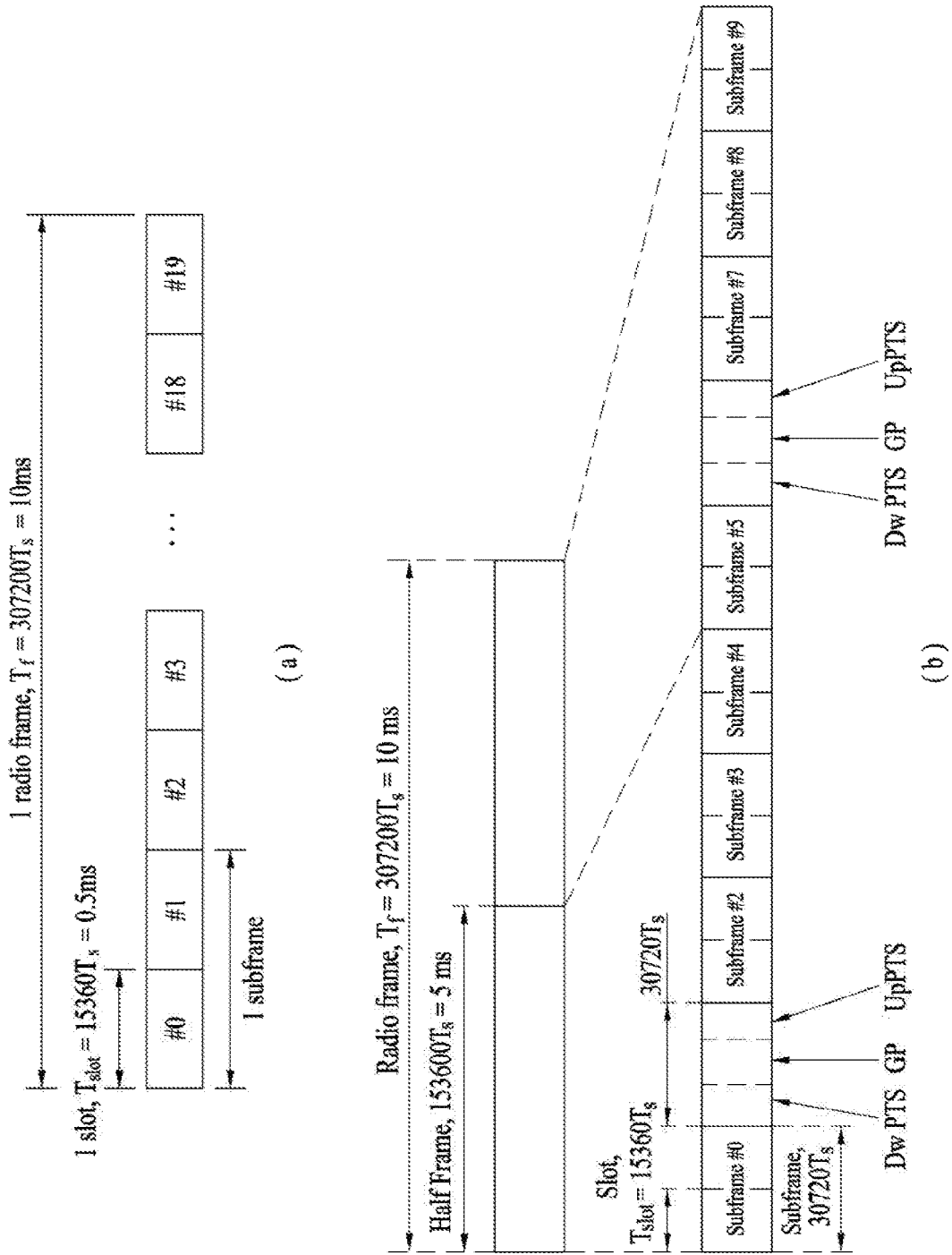
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC- FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
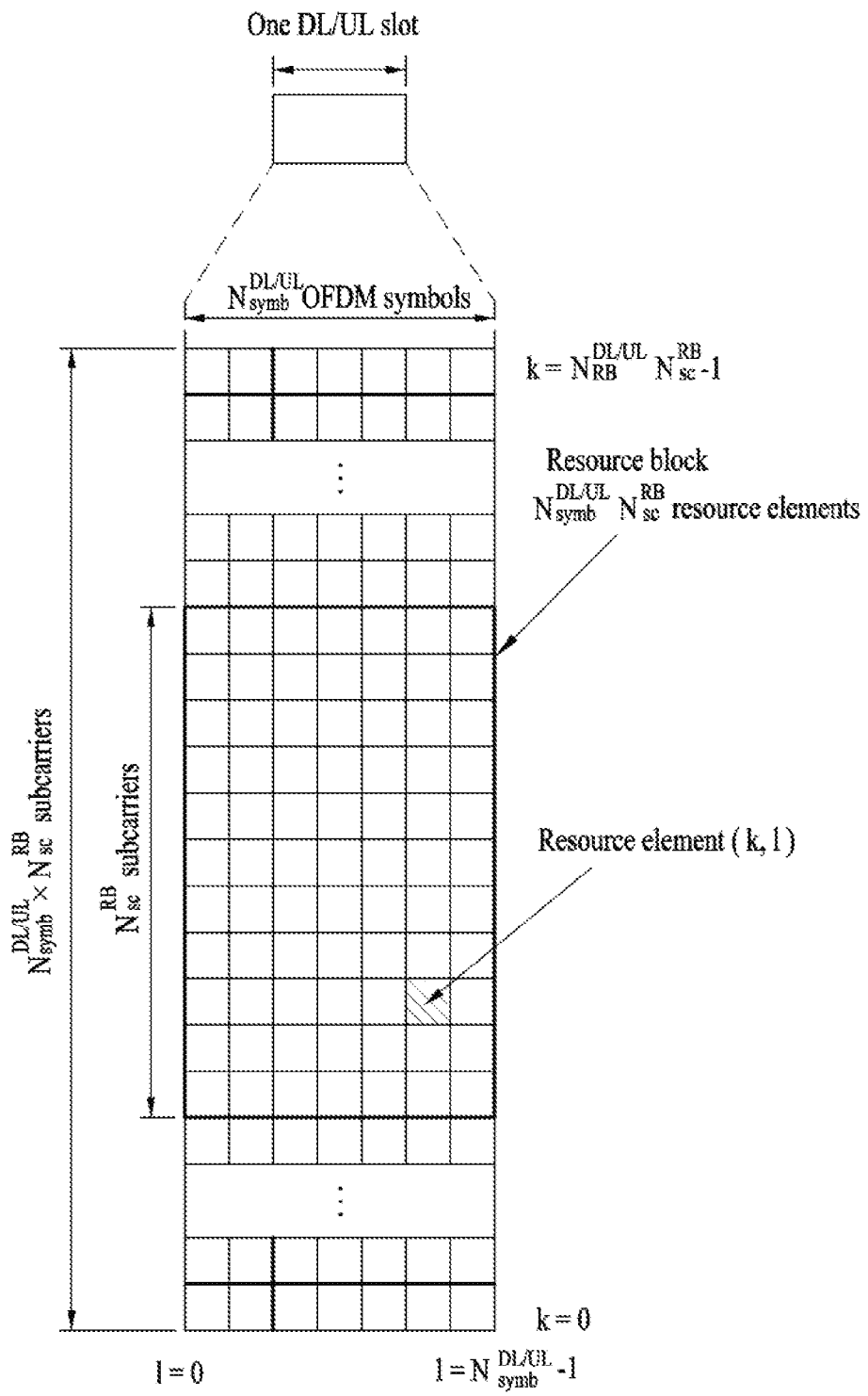
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
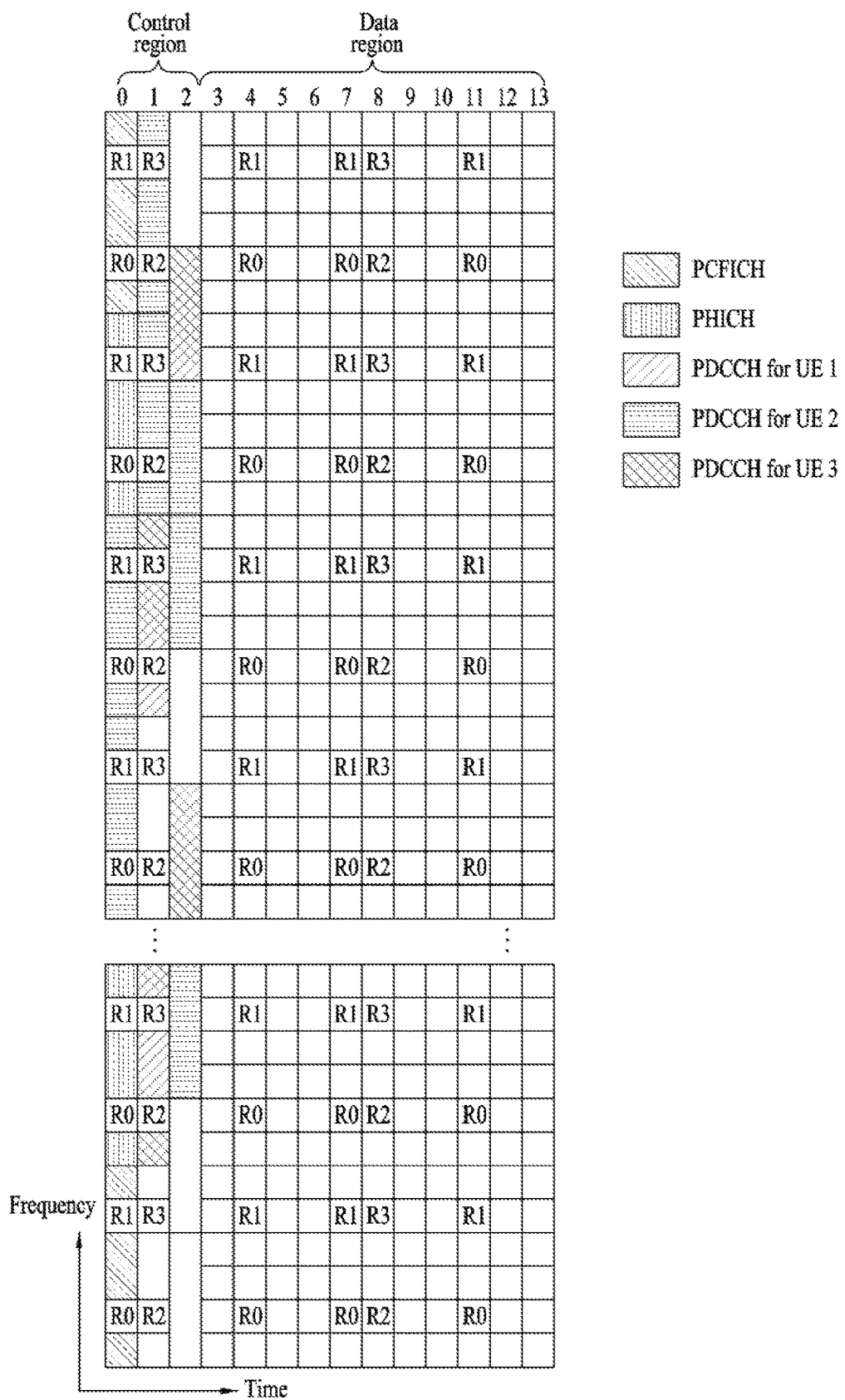
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation and coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Figure 4:
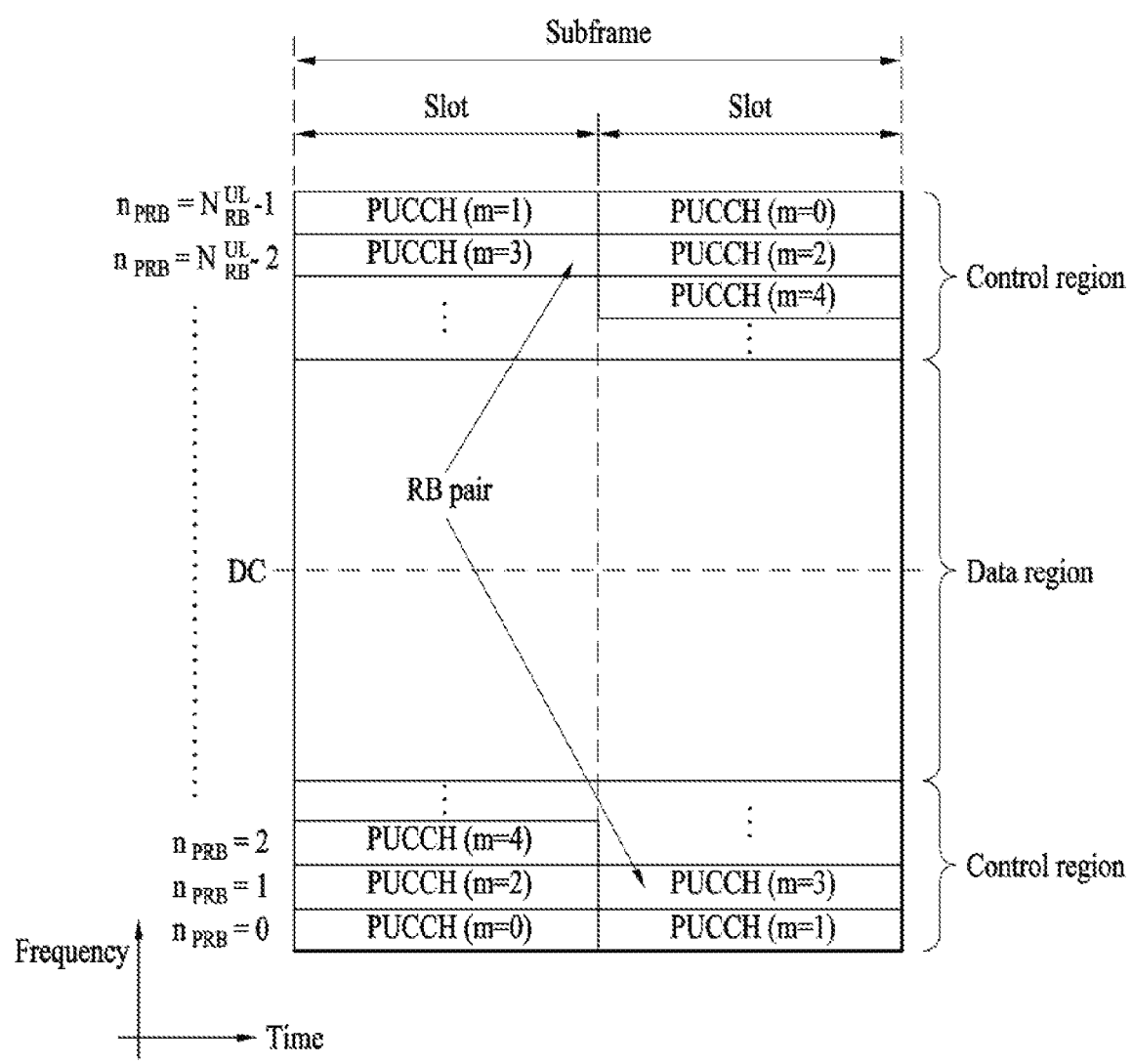
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
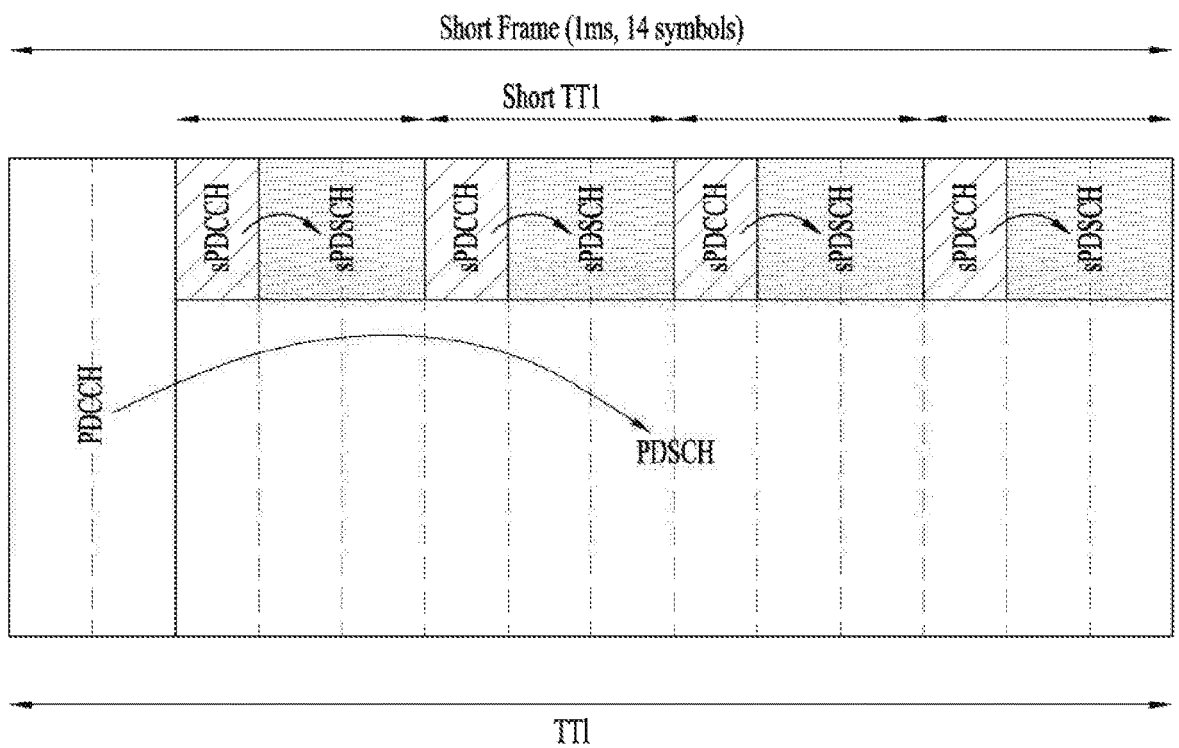
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table.

TABLE 1

| Parameter | Value |
| --- | --- |
| Subcarrier-spacing ($\Delta f$) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
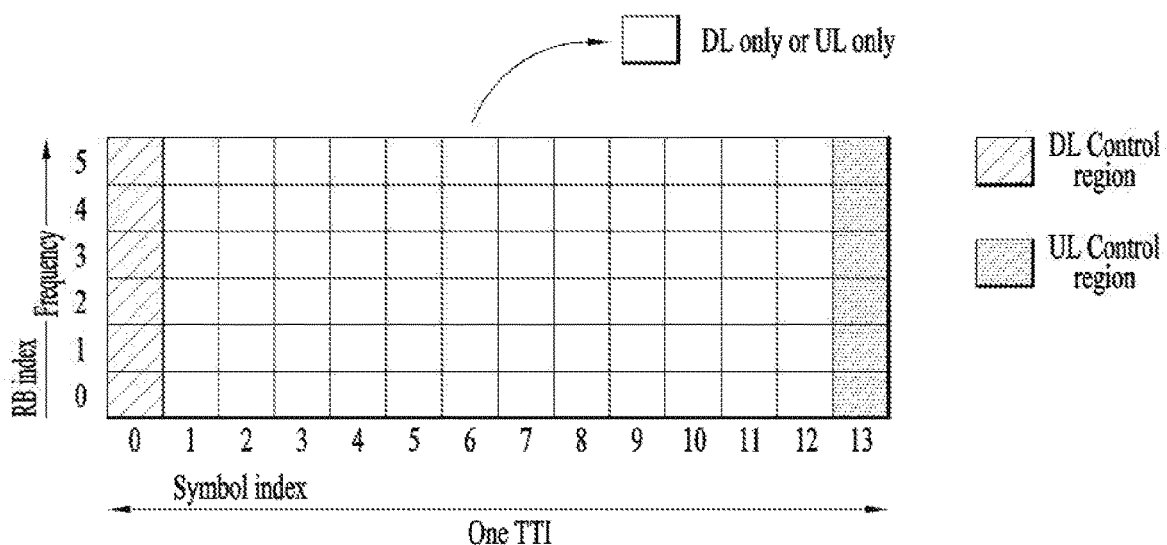
FIG. 6 illustrates a subframe structure.

FIG. 6 illustrates a subframe structure in a new radio access technology (NR).

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
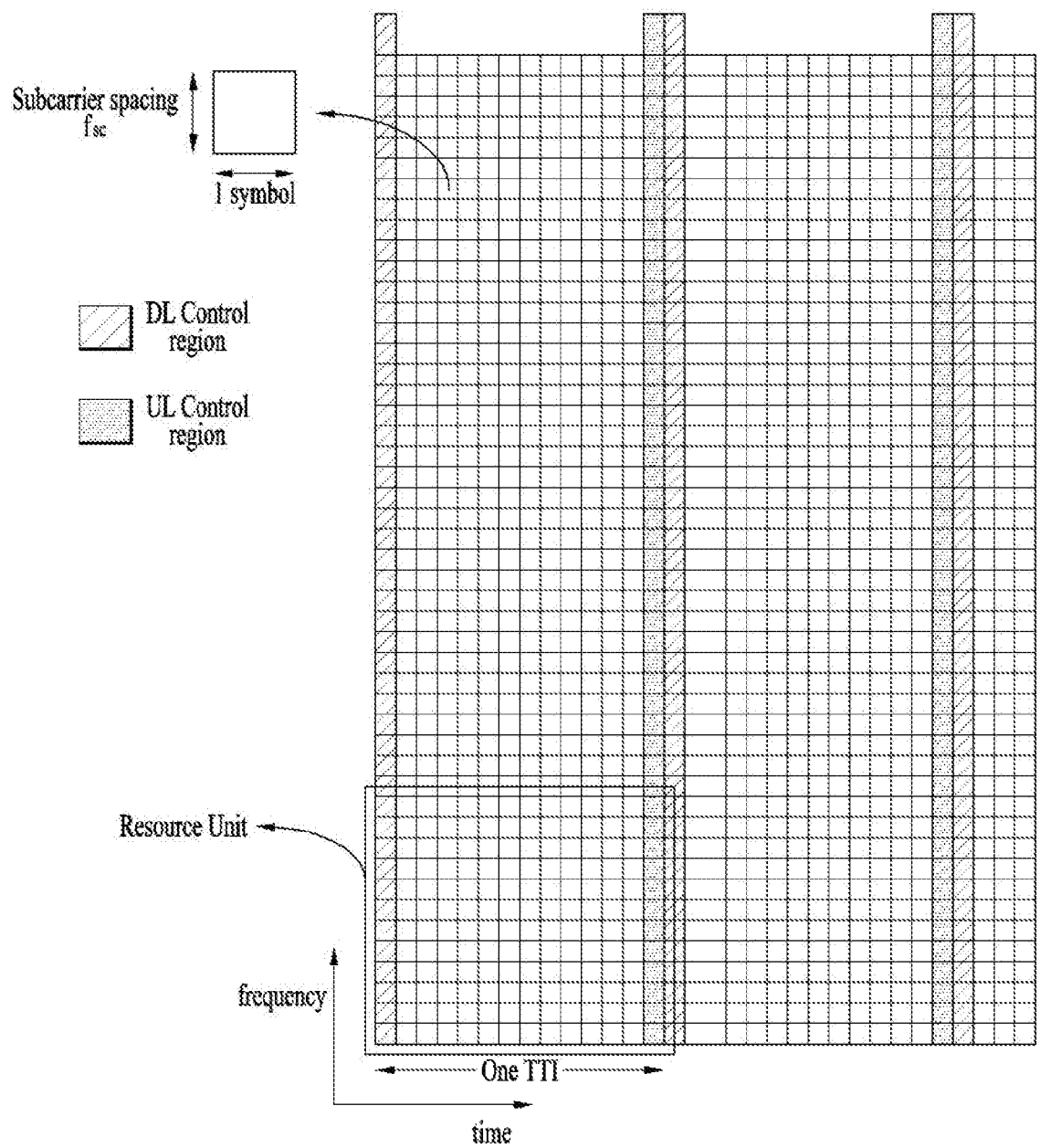
FIG. 7 illustrates a part of a radio frame based on a subframe structure in which a data channel and a control channel are time-division-multiplexed.

FIG. 7 illustrates a part of a radio frame based on a subframe structure in which a data channel and a control channel are TDMed.

Referring to FIG. 7, in a wideband system, a DL control channel can be Time Division Multiplexed (TDMed) with DL data or UL data and then transmitted. In this case, although an eNB may transmit a DL control channel(s) over the entire band, but one UE may receive its DL control channel in specific partial band rather than the entire band. In this case, the DL control channel corresponding to information transmitted from the eNB to the UE may contain not only DL specific information such as DL scheduling but also information on a cell configuration and UL specific information such as UL grant.

As illustrated in FIG. 7, a basic resource unit (RU) for DL/UL scheduling may be defined even in a new RAT system as well as in the legacy LTE system. A plurality of OFDM symbols is included in the time domain and a plurality of subcarriers is included in the frequency domain. The basic RU may be defined with different sizes in UL and DL. The eNB may perform DL/UL data scheduling for the UE in units of RUs, i.e., in units of RUs of an integer. In FIG. 7, one box of a time-frequency resource grid, i.e., one subcarrier of one OFDM symbol length, may be defined as a resource element (RE).

For example, it is expected that the new RAT system, which is called the mmWave system or 5G system, will use wide system bandwidth. Specifically, depending on the frequency band, the minimum system bandwidth of 5 MHz, 10 MHz, 40 MHz, 80 MHz, etc. should be able to be supported. The minimum system band may vary according to the basic subcarrier spacing. For example, when the basic subcarrier spacing is respectively set to 15 kHz, 30 kHz, 120 kHz, and 240 kHz, the minimum system band may be 5 MHz, 10 MHz, 40 MHz, and 80 MHz, respectively. For example, the new RAT system is designed such that it operates on not only 6 GHz or less but 6 GHz or more and a plurality of subcarrier spacings are used in one system to support various scenarios and use cases. When the subcarrier spacing is changed, the length of a subframe can increase/decrease according to the change in the subcarrier spacing. For example, one subframe may be defined to have a short time period, for example, 0.5 ms, 0.25 ms, 0.125 ms, etc. It is expected that the new RAT system will use high frequency band (e.g., 6 GHz or higher) and support a subcarrier spacing greater than 15 kHz, i.e., the subcarrier spacing of the conventional LTE system. Assuming that the subcarrier spacing is 60 kHz, one resource unit (RU) can be defined as twelve subcarriers in the frequency domain and one subframe in the time domain.

Figure 8:
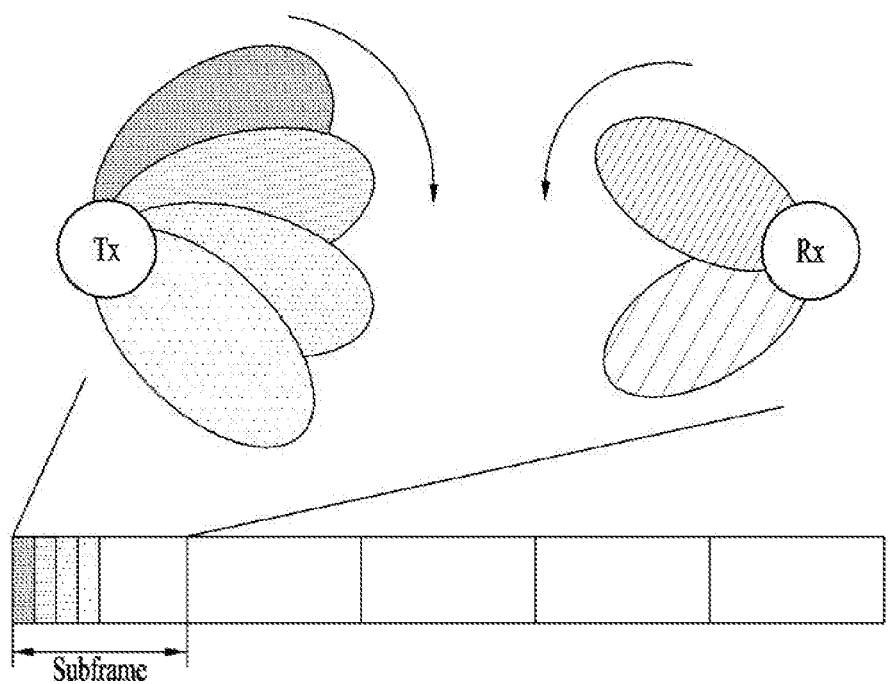
FIG. 8 illustrates an application example of analog beamforming.

FIG. 8 illustrates a transmission/reception method of a radio signal using an analog beam. Particularly, FIG. 8 illustrates a transmission/reception method of a radio signal by transmission/reception (Tx/Rx) analog beam scanning.

Referring to FIG. 8, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

<Multi-Subframe Scheduling>

Referring to the subframe structure illustrated in FIG. 6, DL control information, DL/UL data, and UL control information may be transmitted/received during one subframe or one TTI. Modifications to the subframe may include subframes in the form of 'DL control information+DL data', 'DL control information+UL data', 'DL data+UL control information', 'UL data+UL control information', 'DL data only', and 'UL data only'. When DL and UL coexist in one subframe, a gap period for switching between DL and UL may be present in the subframe. When DL traffic is heavy, particularly, when traffic destined for a specific UE is heavy, a PDSCH for a plurality of subframes may be scheduled in one subframe. In this case, a specific subframe may be a DL data only subframe. Then, since a PDCCH region is not present in the specific subframe, PDCCH overhead is reduced. Such scheduling is referred to as multi-TTI or multi-subframe scheduling.

Figure 9:
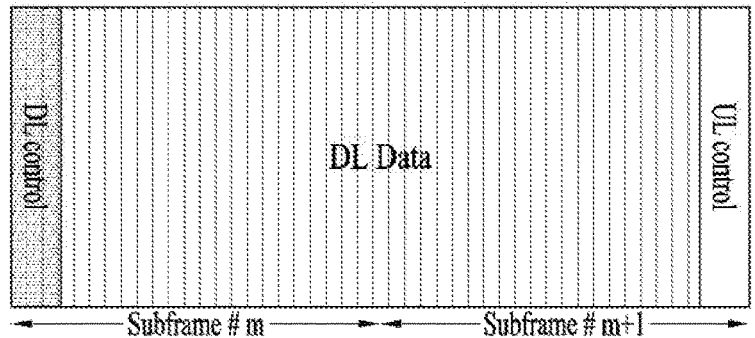
FIGS. 9 to 11 illustrate subframe structures formed by multi-subframe scheduling according to the present invention.
Figure 10:
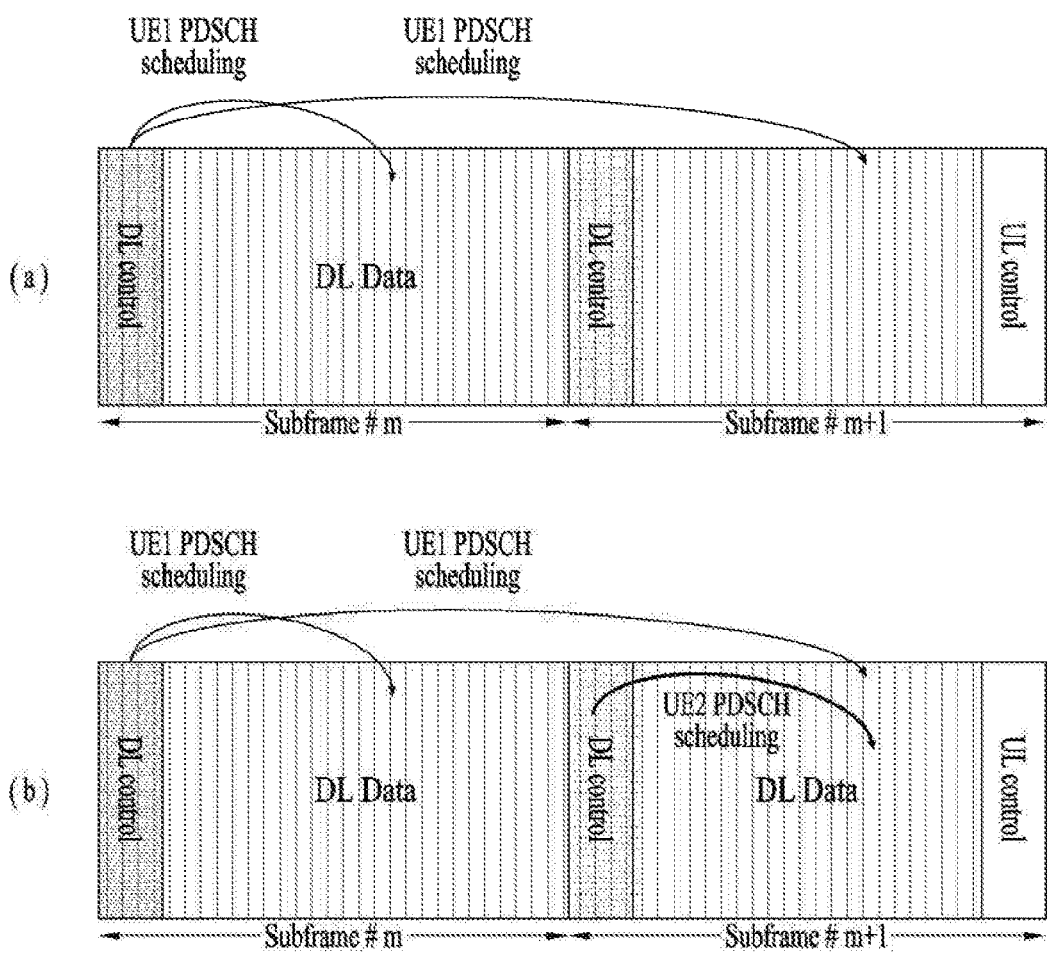
Figure 11:
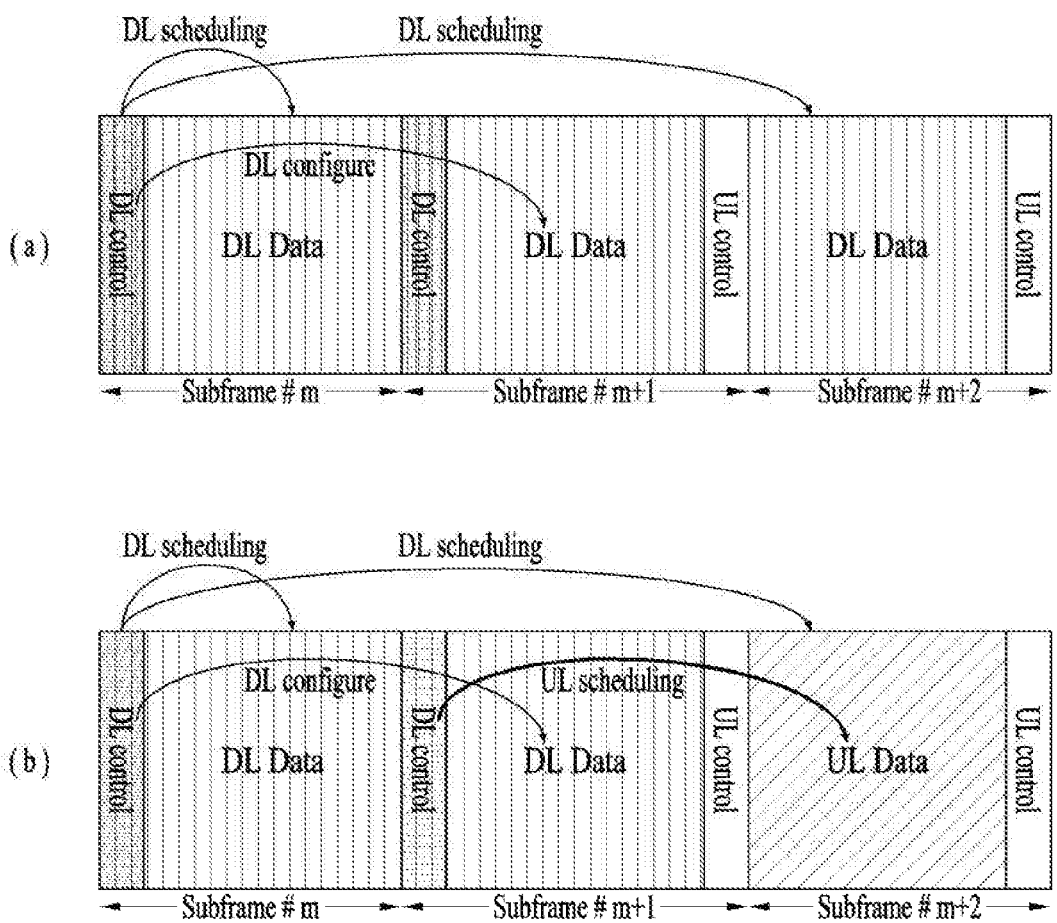

FIGS. 9 to 11 illustrate subframe structures formed by multi-subframe scheduling according to the present invention. Hereinbelow, the present invention will be described under the assumption that the subframe structures of FIGS. 9 to 11 are maintained in a system band or a subband of a predetermined size.

FIG. 9 illustrates the case in which an eNB schedules a PDSCH for subframes #m and #m+1 for a UE that has received a DL grant in subframe #m. The UE is previously aware that a PDCCH will not be transmitted in subframe #m+1 through DL DCI received in subframe #m. Therefore, the UE may not perform blind detection (BD) for the PDCCH in a start part of subframe #m+1.

Upon scheduling data through multi-subframe scheduling, the eNB may schedule DL or UL data for one UE through respective DCIs for multiple subframes. However, in order to reduce scheduling overhead, the eNB may transmit a DL/UL grant for multiple subframes to one UE through one DCI.

Notably, when subframe(s) for DL data are configured through multi-TTI scheduling, if an urgent data service is needed, the eNB or the UE may not immediately cope with the urgent data service. Accordingly, for a specific urgent data service, a subframe structure should be designed such that the UE may receive the specific urgent data service from the eNB even if multi-TTI scheduling is performed. Then, the UE should be able to receive DL control information/ channel even when DL data is scheduled to be received through multi-TTI scheduling. In other words, the subframe structure should be designed such that the UE monitors and/or receives the DL control channel by default in every subframe. For example, the UE should perform BD while expecting that a PDCCH will be present on start OFDM symbol(s) of a specific number n (n>=1) in every subframe. In this case, even if control signaling is not actually present, the UE performs monitoring as to whether control signaling is present in every subframe. If the UE performs the monitoring operation, even when DL data is scheduled for the UE that has received scheduling information in subframes #m and #m+1 as illustrated in FIG. 9, the UE should monitor the DL control channel in subframe #m+1 as illustrated in FIG. 10(a). DL data of subframes #m and #m+1 is scheduled for the UE by DL control signaling in subframe #m. The UE performs BD on the premise that there is a possibility that the DL control channel is present at a start point of a subframe even in a time-frequency region scheduled for a PDSCH of the UE. Upon performing BD, if the UE fails to detect DL/UL DCI thereof, the UE regards a corresponding region as a region in which a DL control signal is not present and receives the PDSCH as scheduled in a previous subframe.

However, if the UE detects the DL/UL DCI thereof in a DL control region of subframe #m+1, the DL/UL DCI received in subframe #m+1 is prioritized relative to DL scheduling information received in subframe #m, which is a previous subframe. The DL/UL DCI detected in subframe #m+1 may be signaling for releasing PDSCH scheduling for subframe #m+1, that the UE has received in subframe #m, or signaling for scheduling other data of the UE. Alternatively, the DL/UL DCI detected in subframe #m+1 may be signaling for delaying a transmission timing of information which has already been scheduled for the UE. Referring to FIG. 10(b), if the eNB schedules subframes #m and #m+1 for a specific UE, for example, UE1, in subframe #m, the eNB may schedule subframe #m+1 for another UE, for example, UE2, in the DL control region of subframe #m+1. In this case, the eNB may transmit, in subframe #m+1, resource releasing signaling indicating that there is no scheduling for the PDSCH of subframe #m+1 to UE1 and may additionally transmit DL DCI for scheduling the PDSCH for UE2 in subframe #m+1. Alternatively, even when scheduling for subframe #m+1 for the same UE has already been performed, scheduling for a service of another type may be performed in subframe #m+1. In this case, the eNB may perform additional PDSCH scheduling for subframe #m+1 through the DL DCI for the same UE while transmitting resource release signaling as described above. As another method, the eNB may perform additional PDSCH scheduling through the DL DCI without transmitting additional resource release signaling for scheduling for the same UE. In this case, the UE does not combine, for decoding, the PDSCH received in subframe #m and the PDSCH received in subframe #m+1 and may recognize the PDSCH received in subframe #m and the PDSCH received in subframe #m+1 as separate codewords or separate HARQ processes.

<PDSCH/Transport Block Mapping>

Even if data has been prescheduled for a specific subframe through multi-subframe scheduling, another UE may be scheduled later in the specific subframe. In consideration of this point, DL data fills all the scheduled first OFDM symbol and then is mapped to the next OFDM symbol within a time-frequency resource allocated to a UE. That is, the DL data is mapped according to a time-first frequency-next mapping scheme. Thus, if the UE receives a PDSCH in subframe #m, and a PDSCH of another UE is scheduled in subframe #m+1 or a PDSCH which is for the same UE but has a different HARQ process is scheduled in subframe m+1, the UE may attempt to perform decoding only by the PDSCH received in subframe #m.

If a specific UE is scheduled for multiple subframes in one subframe #m, an MCS/HARQ process may be assigned with respect to each transport block (TB) transmitted in each of the plural subframes. In addition, since scheduling for the same frequency region for the same UE is performed, MCS/RB assignment may be commonly signaled.

Additionally, when the eNB schedules data for a UE through multi-subframe scheduling, TBs transmitted in respective subframes may be independently transmitted in the respective subframes or one TB may be transmitted in plural subframes. Then, ACK/NACK (A/N) transmission differs. Data transmission and A/N transmission schemes according to each TB transmission scheme may be summarized as follows.

* Case in which an Individual TB is Transmitted in Each Subframe

Scheme 1) When an individual TB is transmitted in each subframe and scheduling DCI is transmitted for each TB, an A/N is transmitted with respect to each TB. Since, in Scheme 1, DCI for each TB is transmitted and the UE indicates a timing at which the TB is transmitted through the DCI as a k-th specific subframe after receiving the DCI, there is almost no difference between this scheme and a legacy A/N transmission scheme for each TB.

Scheme 2) Even when data for multiple subframes is scheduled, it is desirable that a normal data service be scheduled in a subframe of a minimum size in consideration of the case in which an urgent data service overrides a normal data service area. That is, even if data for multiple subframes is consecutively scheduled for the one UE, data is desirably transmitted such that the UE may perform, in each subframe, decoding for data received in the multiple subframes. Therefore, TBs transmitted in multiple subframes may be scheduled through one scheduling DCI. The UE may generate an A/N for each TB. An A/N transmission scheme for each TB is as follows. An A/N for a TB scheduled through one DCI may be individually transmitted at an individual timing, one A/N may be transmitted at a time, or an A/N for a subset of scheduled TBs may be transmitted.

Option 1: One A/N may be transmitted with respect to one DCI. That is, when a plurality of TBs is scheduled through one DCI, one A/N combined with respect to the plural TBs is transmitted as A/Ns for the plural TBs (capable of being transmitted in different subframes).

Option 2: An A/N for each TB is transmitted. In this case, the A/N for each TB is transmitted at an individual timing.

Option 3: An A/N for a combination of partial TBs among the plural TBs scheduled at a time may be transmitted and the A/N for the combined TBs may be transmitted at an individual timing.

Subsequent retransmission may be performed with respect to each TB.

When a TB is transmitted in each subframe and A/N transmission is performed for each TB, if PDSCH(s) for multiple subframes #m and #m+1 are scheduled for a UE in subframe #m but scheduling for a new UE or new data is abruptly commanded through new DCI in subframe #m+1, the UE transmits an A/N depending on whether data has been successfully received in subframe #m. In this case, since a plurality of TBs has been allocated to the UE in subframe #m in which scheduling for the multiple subframes has been commanded, it can be said that multiple A/N resources corresponding to the plural TBs have been allocated to the UE in subframe #m. Even if the multiple A/N resources have been allocated to the UE in subframe #m, an A/N for a TB transmitted in subframe #m is transmitted using only an A/N resource corresponding to the TB transmitted in subframe #m.

* Case in which One TB is Transmitted in Multiple Subframes

When the eNB performs scheduling for multiple subframes, one TB may be transmitted during the multiple subframes. In this case, even if the TB is transmitted during the multiple subframes, since only one TB has been transmitted, the UE transmits only one A/N. If other UEs or other data is scheduled in a specific subframe while the TB scheduled in the multiple subframes is transmitted, the UE may attempt to perform decoding only for an already received part. If the UE fails to perform decoding, the UE may transmit NACK, store the data in a soft buffer, and attempt to perform decoding by combining the data with retransmitted data. The number of subframes in which the retransmitted data is transmitted may be different from the number of scheduled subframes during previous initial transmission. For example, for retransmission for data having been scheduled in multiple subframes, data may be scheduled in one subframe rather than multiple subframes.

<DL/UL Switching>

Hereinafter, a scheme of switching a link direction of a subframe will be proposed. That is, link directions for one or more subsequent subframes may be preconfigured in a specific subframe. Whether one or more subframes subsequent to a specific subframe are subframes in which DL data is transmitted, subframes in which UL data is transmitted, subframes in which DL data/control information only is transmitted, or subframes in which UL data/control information only is transmitted may be signaled to the UE in the specific subframe. In particular, from the viewpoint of the UE, whether DL data is scheduled or UL data is scheduled in one or more subframes subsequent to the specific subframe may be preindicated to the UE through control channel transmission.

Referring to FIG. 11(a), it is assumed that a DL grant for subframes #m, #m+1, and m+2 has been transmitted in subframe #m through a DL control channel. Alternatively, it is assumed that control signaling indicating DL subframes to represent that DL data will be transmitted in the corresponding subframes has been transmitted. Then, the UE may recognize that the corresponding subframes are the DL subframes and wait for DL data to be received according to the DL grant that the UE has received. A separate TB may be transmitted in each subframe or one TB may be transmitted in multiple subframes.

However, if UL data needs to be transmitted at a specific timing after subframes #m, #m+1, and #m+2 are configured as DL subframes and DL scheduling for subframes #m, #m+1, and #m+2 is previously performed, the eNB may switch a subframe configured as a DL subframe to a UL subframe. Referring to FIG. 11(b), after scheduling UL data for subframe #m+2 through a DL control channel of subframe #m, the eNB may configure subframe #m+2 as the UL subframe through a DL control channel of a specific subframe, for example, subframe #m+1 or #m+2. The eNB may transmit common signaling indicating that the specific subframe is the UL subframe through the DL control channel or transmit signaling indicating that a corresponding DL grant is not valid, i.e., that DL scheduling should be canceled, to the UE to which the eNB has transmitted DL scheduling. Alternatively, the eNB may cause the UE to transmit UL data by transmitting a UL grant for the specific subframe to the UE to which the eNB has transmitted DL scheduling.

The UE may prioritize most recently received information and the most recently received control information may override already received information.

The eNB may transmit UE-specific signaling in order to switch a link direction of a subframe. If the UE which has already received a DL grant for a specific subframe in a previous subframe of the specific subframe receives information indicating that the DL grant is not valid in the specific subframe, the UE expects that DL data therefor will not be transmitted in the specific subframe. Alternatively, a network may transmit a signal indicating in which subframe after the subframe in which the DL grant is transmitted the DL grant will be valid to the UE. Upon receiving the DL grant and a UL grant for the same subframe, the UE may prioritize most recently received information and perform UL data transmission and DL data reception according to most recently received control information.

When a DL subframe is abruptly switched to a UL subframe, it is necessary to consider an RS which has been configured in the DL subframe. For example, when a CSI-RS is configured in the DL subframe for the purpose of channel quality measurement and radio resource measurement (RRM) for mobility, if the DL subframe is switched to the UL subframe, all configurations for the DL subframe may be invalid and the eNB may signal information about the configurations (e.g., CSI-RS configuration information and measurement configuration information). As another scheme, a time symbol on which the CSI-RS is transmitted may be protected so that dynamic switching to the UL subframe may not be performed. To this end, when the DL subframe is switched to the UL subframe, a time length of the UL subframe may consist of symbols except for symbol(s) used to transmit the CSI-RS.

Similar to switching from the DL subframe to the UL subframe, the UL subframe may be switched to the DL subframe. The eNB may switch a specific subframe, which has been configured through a previous subframe as the UL subframe, to the DL subframe through a subframe after the previous subframe or through DL control signaling of the specific subframe. For example, when the eNB has transmitted a UL grant to the UE to transmit UL data in a specific subframe, the UE may recognize that the specific subframe is the UL subframe. However, if the UE has received the DL grant in the specific subframe before actually performing UL data transmission using the UL grant, the specific subframe should be recognized as the DL subframe by the UE. When the UL grant has been transmitted to the UE to transmit UL data in the specific subframe, if the eNB desires to transmit the DL grant to other UEs that have not received the UL grant, the eNB may transmit signaling indicating that the UL grant is not valid in the specific subframe, signaling indicating in which subframe from the subframe in which the UL grant is transmitted the UL grant is valid, or signaling indicating that the UL grant itself is invalid to the UE which has already received the UL grant.

Meanwhile, an NR system has been designed to multiplex a plurality of different numerologies in one system. Herein, representative numerologies represent a subcarrier spacing and a slot length. In an LTE system, the length (1 ms) of a reference subframe is determined to be 14 OFDM symbols having a normal CP length based on a subcarrier spacing of 15 kHz, whereas, in the NR system, all subcarrier spacings of 15 kHz, 30 kHz, 60 kHz, 120 kHz, and 240 kHz are considered. Especially, the NR system is designed to satisfy tighter latency requirements than the LTE system and, for this reason, a basic scheduling unit may be defined as a slightly short length. That is, if the subframe of the LTE system is 1 ms long, the NR system defines a basic scheduling unit as a slot and it is expected that the longest slot will be 0.5 ms long based on a subcarrier spacing of 15 kHz. That is, 7 OFDM symbols constitute one slot when a subcarrier spacing is 15 kHz and scheduling may be performed in units of a slot. When the subcarrier spacing is 15 kHz or 30 kHz, 7 OFDM symbols may constitute one slot and, when the subcarrier spacing is 120 kHz or 240 kHz, 14 OFDM symbols may constitute one slot. The term "subframe" described in the present invention may be replaced with the term slot in the NR system.

The forgoing description of the present invention has proposed that the UE monitor DCI in every subframe even when multi-subframe scheduling is performed. If a plurality of numerologies is supported in the NR system, it is appreciated that a subcarrier space that one UE should support is plural. Even when the UE is scheduled in a long slot, if the UE should simultaneously support a short slot together with the long slot, the UE should perform DCI monitoring in units of a short slot. In other words, if subcarrier spacings supported by a system are 15 kHz and 60 kHz and subcarrier spacings that the UE should support in the system are 15 kHz and 60 kHz and if the subcarrier spacings of 15 kHz and 60 kHz may be dynamically switched, the UE should monitor DCI in units of 0.125 ms (an interval of a 60-kHz subcarrier spacing) even when the UE is scheduled in units of 0.5 ms (an interval of a 15-kHz subcarrier spacing).

A unit in which a UE should monitor DCI may be indicated to each UE. Alternatively, a system may indicate DCI monitoring units of UEs. In this case, the shortest slot unit may be indicated as a DCI monitoring unit. Herein, the shortest slot unit is not necessarily only a slot length determined by different subcarrier spacings. There may be data scheduled in a slot having a relatively long slot and data scheduled in a slot having a relatively short slot according to service characteristic and a data rate while a subcarrier spacing is maintained. For example, the length of a normal slot is 0.5 ms based on a subcarrier space of 15 kHz, whereas a transmission unit of ultra-reliable low latency critical service (URLLC) data may be defined as a unit of a length of one or two symbols. This may be referred to as a mini slot in NR. That is, urgent data may be processed without changing a subcarrier spacing in a corresponding system and a mini-slot defined for urgent data transmission is defined together with a normal slot length. For an urgent data service, the UE should monitor DCI in the shortest slot unit in a system, i.e., the shortest time unit (or indicated time unit) in which data can be transmitted while receiving a service in the normal slot length.

Figure 12:
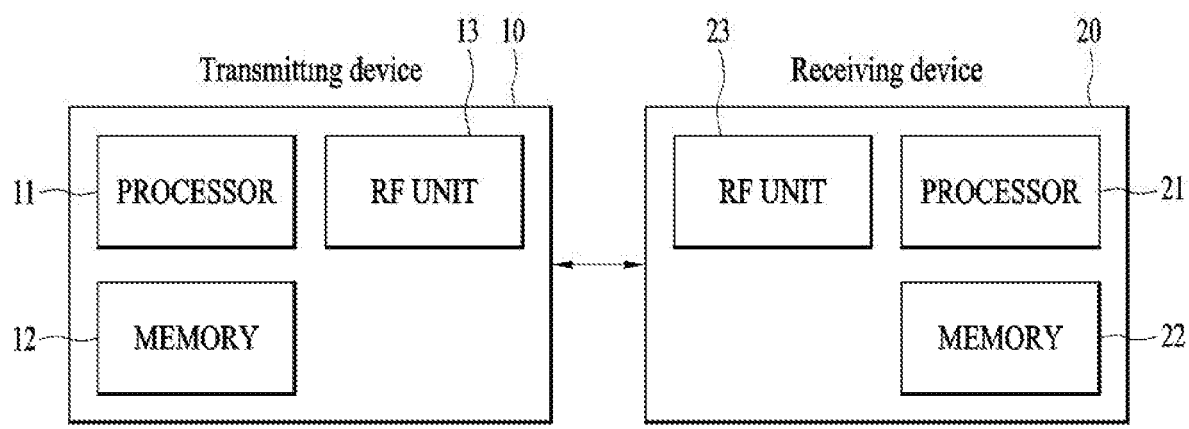
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit scheduling information, i.e., DL control information, for each of multiple subframes to the UE in one subframe. The eNB processor may cancel or change scheduling information for at least one of the multiple subframes and control the eNB RF unit to transmit DL control information indicating that the scheduling information has been canceled or changed. The eNB processor may control the eNB RF unit according to the DL control information.

The UE RF unit may receive the scheduling information, i.e., the DL control information, for each of multiple subframes in a specific subframe. The UE processor may monitor the DL control information in each of the multiple subframes. The processor may control the UE RF unit to receive DL data or transmit UL data, in a subframe in which the DL control information is not detected, based on the scheduling information received in the specific subframe. The UE processor may control the UE RF unit based on new DL control information in a subframe in which the new DL control information is received among the multiple subframes. If the new DL control information indicates that scheduling information for a corresponding subframe received in the specific subframe is not valid, the UE processor may not perform reception of DL data or transmission of UL data according to the scheduling information. If the new DL control information is new scheduling information for a corresponding subframe, the processor may control the UE RF unit to receive the DL data or transmit the UL data according to the new scheduling information.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:
1. A method of receiving a downlink (DL) signal by a user equipment (UE), the method comprising:

receiving, in a control region of a first time interval, first DL control information (DCI) that schedules transmissions in a second time interval;
monitoring, in a control region of the second time interval, for a second DCI that schedules transmissions in the second time interval; and
in response to detecting the second DCI in the control region of the second time interval, performing a first operation in the second time interval based on the detected second DCI; and
in response to not detecting the second DCI in the control region of the second time interval, performing a second operation in the second time interval based on the first DCI, wherein the first and second operations are different, wherein the second DCI includes information for informing that the first DCI is valid for scheduling a third time interval after the second time interval.

2. The method of claim 1,
wherein the second DCI includes different resource allocation information from the first DCI, and
wherein based on that the second DCI is detected in the control region of the second time interval, DL data is received or UL data is transmitted in a data region of the second time interval based on the different resource allocation information.

3. The method of claim 1,
wherein the second DCI includes information informing that the first DCI is not valid in the second time interval.

4. The method of claim 1,
wherein based on that
the first DCI is a DL grant,
a DL reference signal configured in the second time interval is present, and
the second DCI is detected in the control region of the second time interval,
UL data is transmitted on time symbols on which the DL reference signal is not present within the second time interval, based on a UL grant obtained for the UL data.

5. A user equipment (UE) for receiving a downlink (DL) signal, the UE comprising:
a radio frequency (RF) module including a transceiver, and a processor configured to control the RF module,
wherein the processor:
controls the RF module to receive, in a control region of a first time interval, first DL control information (DCI) that schedules transmissions in a second time interval;
monitors, in a control region of the second time interval, a second DCI that schedules transmissions in the second time interval;
in response to detecting the second DCI in the control region of the second time interval, controls the RF module to perform a first operation, based on the second DCI; and
in response to not detecting the second DCI in the control region of the second time interval, controls the RF module to perform a second operation in the second time interval based on the first DCI,
wherein the first and second operations are different,
wherein the second DCI includes information for informing that the first DCI is valid for scheduling a third time interval after the second time interval.

6. The UE of claim 5,
wherein the second DCI includes different resource allocation information from the first DCI, and
wherein based on that the second DCI is detected in the control region of the second time interval, the processor controls to the RF module to receive DL data or transmit UL data in a data region of the second time interval based on the different resource allocation information.

7. The UE of claim 5,
wherein the second DCI includes information informing that the first DCI is not valid in the second time interval.

8. The UE of claim 5,
wherein based on that
the first DCI is a DL grant,
a DL reference signal configured in the second time interval is present, and
the second DCI is detected in the control region of the second time interval,
the processor controls the RF module to transmit UL data on time symbols on which the DL reference signal is not present within the second time interval, based on a UL grant obtained for the UL data.

9. A base station (BS) for transmitting a downlink (DL) signal, the BS comprising:
a radio frequency (RF) module; and
a processor configured to control the RF module,
wherein the processor:
controls the RF module to transmit, to a user equipment (UE) in a control region of a first time interval, first DL control information (DCI) that schedules transmissions in a second time interval;
determine whether to transmit, to the UE in a control region of the second time interval, a second DCI, wherein the second DCI schedules transmissions in the second time interval,
in response to determining to transmit the second DCI to the UE in the control region of the second time interval, controls the RF module to:
transmit the second DCI to the UE in the control region of the second time interval, and
perform a first operation in the second time interval, wherein the first operation is based on the second DCI; and
in response to determining to not transmit the second DCI to the UE in the control region of the second time interval, controls the RF module to perform a second operation in the second time interval based on the first DCI, wherein the first and second operations are different,
wherein the second DCI includes information for informing that the first DCI is valid for scheduling a third time interval after the second time interval.

10. The BS of claim 9, wherein the second DCI includes different resource allocation information from the first DCI, and wherein based on that the second DCI is transmitted to the UE in the control region of the second time interval, the processor controls the RF module to transmit DL data or receive UL data in the data region of the second time interval based on the different resource allocation information.

11. The BS of claim 9, wherein the second DCI includes information informing that the first DCI is not valid in the second time interval.

12. The BS of claim 9,
wherein based on that
the first DCI is a DL grant,
a DL reference signal configured in the second time interval is present, and
the second DCI is transmitted in the control region of the second time interval, the processor controls the RF module to receive UL data on time symbols on which the DL reference signal is not present within the second time interval, based on a UL grant obtained for the UL data.

\* \* \* \* \*